United States Patent [19]

Dams et al.

[11] Patent Number: 5,210,106

[45] Date of Patent: May 11, 1993

[54] FINE-CELLED PLASTIC FOAM CONTAINING FLUOROCHEMICAL BLOWING AGENT

[75] Inventors: Rudolf J. Dams, Antwerpen, Belgium; Richard M. Flynn, Mahtomedi, Minn.; Koen Focquet, Antwerpen, Belgium; John G. Owens, White Bear Lake, Minn.

[73] Assignee: Minnesota Mining and Manufacturing Company, St. Paul, Minn.

[21] Appl. No.: 771,442

[22] Filed: Oct. 4, 1991

[51] Int. Cl.$^5$ .............................................. C08G 18/14
[52] U.S. Cl. ................................... 521/110; 521/131; 252/182.24; 252/182.27
[58] Field of Search .............................. 521/110, 131; 252/182.24, 182.27

[56] References Cited

U.S. PATENT DOCUMENTS

| | | | |
|---|---|---|---|
| 3,404,105 | 10/1968 | Rossmy | 260/2.5 |
| 3,518,288 | 6/1970 | Haluska | 260/448.2 |
| 3,519,579 | 7/1970 | Kanner et al. | 260/2.5 |
| 3,594,334 | 7/1971 | Martin | 260/2.5 |
| 3,787,351 | 1/1974 | Olson | 260/40 R |
| 4,156,636 | 5/1979 | Muller et al. | 204/77 |
| 4,205,138 | 5/1980 | Muller et al. | 521/158 |
| 4,221,876 | 9/1980 | Wagner | 521/158 |
| 4,247,653 | 1/1981 | Wagner | 521/158 |
| 4,255,529 | 3/1981 | Mohring et al. | 521/158 |
| 4,326,086 | 4/1982 | Mohring et al. | 568/388 |
| 4,341,909 | 7/1982 | Schneider et al. | 568/863 |
| 4,972,002 | 11/1990 | Volkert | 521/120 |
| 4,981,879 | 1/1991 | Snider | 521/131 |
| 4,997,706 | 3/1991 | Smits et al. | 428/304.4 |

FOREIGN PATENT DOCUMENTS

| | | |
|---|---|---|
| 0431542A2 | 12/1990 | European Pat. Off. . |
| 0439283A1 | 7/1991 | European Pat. Off. . |
| 2638759 | 3/1978 | Fed. Rep. of Germany . |
| 2706297 | 8/1978 | Fed. Rep. of Germany . |
| 1114428 | 5/1968 | United Kingdom . |
| 1130824 | 10/1968 | United Kingdom . |
| 1151960 | 5/1969 | United Kingdom . |

OTHER PUBLICATIONS

Volkert, "PUR Foams Prepared with Emulsified Perfluoroalkanes as Blowing Agents", *Polyurethanes World Congress 1991* (Sep. 24–26, 1991), pp. 740–744.

"Cellular Materials", Encyclopedia of Polymer Science and Engineering, vol. 3, pp. 1–59, (2nd ed. John Wiley & Sons, 1985).

Encyclopedia, vol. 2, pp. 434 and 437.

Chemical and Engineering News, Jul. 16, 1990, pp. 5–6.

Polyurethanes World Congress 1991 (Sep.24–26, 1991), "New Surfactant Technology for HCFC-123 and HCFC-141b Blown Rigid Foam Systems", (pp. 191–196).

Zaske et al., Journal of Cellular Plastics, Nov.–Dec., pp. 38–45 (1981).

*Primary Examiner*—Maurice J. Welsh
*Attorney, Agent, or Firm*—Gary L. Griswold; Walter N. Kirn; Carolyn V. Peters

[57] ABSTRACT

A blowing agent emulsion comprising a blowing agent mixture, such that the mixture comprises (1) one or more low boiling, hydrochlorofluorocarbon, and/or one or more low boiling, hydrofluorocarbon and (2) one or more low boiling chlorine-free perfluorinated compound; a foamable polymerizable reaction mixture, and a fluorochemical surfactant, optionally, a silicone surfactant, and a catalyst; a foamed plastic; and a process for making thereof.

28 Claims, No Drawings

FINE-CELLED PLASTIC FOAM CONTAINING FLUOROCHEMICAL BLOWING AGENT

This invention relates to a blowing agent, an emulsion containing a hydrochlorofluorocarbon blowing agent, a perfluorocarbon blowing agent, and surfactant; a foamed plastic containing blowing agents; a process of preparing foamed plastic; and a method of using such foamed plastic, for example, to insulate articles of manufacture, such as appliances with such foams.

According to "Cellular Materials," Encyclopedia of Polymer Science and Engineering, vol. 3, pages 1–59, (2d ed. John Wiley & Sons, 1985), foamed plastic is defined as a plastic in which the apparent density decreases substantially with the presence of numerous cells disposed through its mass. The gas phase in a foamed plastic is generally distributed in cells. Blowing agents produce gas used to generate cells in foamable polymeric materials, for example, to make foamed insulation. Physical blowing agents form cells by a phase change, for example, a liquid may be volatilized or a gas dissolved in a polymer under high pressure.

Commercially important liquid blowing agents are aliphatic hydrocarbons and their chloro- and fluoro-derivatives. For example, isomers of pentane, hexane, and heptane are used mainly in the production of very low density polystyrene foam. These liquids tend to be inexpensive and low in toxicity. However, they are highly flammable. See Encyclopedia, vol. 2, page 437, supra.

Methylene chloride is the most widely used chlorohydrocarbon blowing agent, it is nonflammable, and since the compound contains chlorine, methylene chloride may be subjected to the same restrictions as chlorofluorocarbons and it is, in addition, a toxic, carcinogenic compound.

As discussed in Chemical and Engineering News, Jul. 16, 1991, pages 5–6, physical blowing agents, such as low boiling liquids, particularly chlorofluorocarbons (CFCs) and hydrochlorofluorocarbons (HCFCs), are used throughout the world on a large scale to produce foamed plastics, for example to produce polyurethane and polyisocyanurate foams. However, CFCs are linked to the destruction of the earth's protective ozone layer. See Encyclopedia, vol 2, page 434, supra. Depletion of the ozone layer is likely to result in increased cases of skin cancer and ecosystem damage. Consequently, the major culprits are to be phased out by the year 2000, under the U.S. Clean Air Act and the Montreal Protocol. However, many environmental groups are calling for faster phaseout. Some European countries, in particular Germany, are requiring that all CFCs be replaced in polyurethane foams and polyisocyanurate foams by 1995.

Production of cellular plastic products, such as cellular polyurethane elastomers and flexible, semi-rigid or rigid polyurethane foams in the presence of catalysts, blowing agents, processing aids or additives is described in numerous patents and publications in the literature.

A survey of methods of producing cellular polyurethane elastomers, polyurethane foams and polyisocyanurate foams, their mechanical properties and their use can be found, for example, *High Polymers*, Vol. 14, "Polyurethanes," Parts I and II by J. H. Saunders and K. C. Frisch (Interscience Publishers, New York 1962 and 1964), *Plastics Handbook*, Volume VII, "Polyurethanes," 1st ed. 1966, published by R. Vieweg and A. Hochtlen and 2d ed. 1983, published by G. Oertel (Carl Hanser Verlag, Munich), and "Integral Foams," published by H. Piechota and H. Rohr (Carl Hanser Verlag, Munich, 1975).

A recent patent, U.S. Pat. No. 4,972,002 (Volkert), describes producing cellular plastics by the polyisocyanate polyaddition process by reaction of (a) organic and/or modified organic polyisocyanates with (b) at least one high molecular compound with at least two reactive hydrogen atoms and, optionally, (c) low molecular weight chain extenders and/or cross-linking agents in the presence of (d) blowing agents, (e) catalysts, (f) additives and/or processing aids, wherein the blowing agents are low boiling fluorinated aliphatic and/or cycloaliphatic hydrocarbons that have 3 to 8 carbons. For example, perfluorocyclopentane is used as a preferred blowing agent.

Another recent patent, U.S. Pat. No. 4,981,879 (Snider), describes a process for preparing cellular polymers having urethane groups, isocyanurate groups, or both. The cellular polymers are prepared by reacting an organic polyisocyanate with a polyol in the presence of a blowing agent, typically a hydrocarbon, hydrochlorofluorocarbon, or chlorofluorocarbon, a catalyst and a perfluorinated hydrocarbon or a mixture of perfluorinated hydrocarbons, such that the lower boiling perfluorinated hydrocarbons can function as a co-blowing agent.

U.S. Pat. No. 4,997,706 (Smits et al.) describes a process for preparing rigid, closed-cell, polymer foams having urethane groups, isocyanurate groups, or both, and uses $C_{2-6}$ polyfluorocarbon compounds containing no chlorine or bromine atoms as a physical blowing agent.

Briefly, in one aspect of the present invention, a blowing agent (or foaming agent) emulsion is provided comprising:

as a blowing agent, a mixture comprising, (a) one or more low boiling, hydrochlorofluorocarbon (hereinafter referred to as HCFC) and/or one or more low boiling, hydrofluorocarbon (hereinafter referred to as HFC) and (b) one or more low boiling, chlorine-free, perfluorinated compound (herein referred to as PFC);

a fluorochemical surfactant; and a continuous organic phase, for example, a polyol. "Perfluorinated" as used in this application means that essentially all hydrogen atoms have been replaced with fluorine atoms.

The blowing agent mixture is useful for producing foamed plastics by producing gas to generate cells (gas pockets) in foamable polymeric materials. The foamed plastics are fine-celled, such that the microcellular nature of the foam yields improved thermal insulation and exhibits decreased thermal conductivity (lambda values). In a recent paper presented to the Polyurethanes World Congress 1991 (Sep. 24–26, 1991), "New Surfactant Technology for HCFC-123 and HCFC-141b Blown Rigid Foam Systems," (pgs 191–196) the author indicated thermal conductivity values decreased as little as 0.28 mW/mK and were considered to be significant improvements.

The HCFC, HFC, and PFC blowing agents used in the mixtures of the present invention are odorless, nontoxic, noncorrosive, and have a low flammability, preferably the blowing agents or mixture of blowing agents are nonflammable. The blowing agents are low boiling, typically boiling in the range of −50° to 175° C., preferably in the range of $-50°$ to $125°$ C., and more preferably in the range of $-50°$ to $100°$ C. The blowing agent mixture is present in the emulsion in an amount effective to produce a rigid closed-cell foamed plastic, and typically is in the range of 1 to 100 parts by weight per 100 parts of total reaction mixture. The blowing agent mixture is a mixture of (1) HCFC and/or HFC, and (2) PFC, wherein the ratio of HCFC and/or HFC to PFC is typically in the range of 0.1 to 99% by weight of PFC, preferably, in the range of 1 to 75% by weight of PFC. Generally, HCFC and many HFC are soluble in the polyurethane precursor. Despite the solubility of HCFCs and many HFCs, it has been found using the blowing agent mixture of this invention, finecelled foams may be produced with improved thermal conductivity values.

The HCFC blowing agents have the general formula $C_aCl_bH_cF_d$ wherein $a=1$ to 4, $b=1$ to 8, $c=1$ to 8, $d=1$ to 8. Specific examples of suitable HCFC blowing agents useful in practicing the present invention include, among others, trifluorochloropropane, 1,1-dichloro-1-fluoroethane, 2,2-dichloro-1,1,1-trifluoroethane, 1-chloro-1,1-difluoroethane, 2-chloro-1,1,1,2-tetrafluoroethane, 1,1-dichloro-2,2,3,3,3-pentafluoropropane, 1,3-dichloro-1,2,2,3,3-pentafluoropropane, and monochlorodifluoromethane.

The HFC blowing agents have the general formula $C_aH_bF_cO_d$ wherein $a=1$ to 8, $b=1$ to 17, $c=1$ to 17, $d=0$ or 1. Specific examples of suitable HFC blowing agents useful in practicing the present invention include, among others, trifluoromethane, pentafluoroethane, 1,1,1,2-tetrafluoroethane, 1,1-difluoroethane, 1,1,1,4,4,4-hexafluorobutane, 1,1,2,2-tetrafluorocyclobutane, 1-methyl-2,2,3,3,-tetrafluorocyclobutane, 1-trifluoromethyl-1,2,2-trifluorocyclobutane, 1 trifluoro-1,2,2-trifluoromethylcyclobutane, 1-hydro-pentadecafluoroheptane, 2-hydro-3-oxa-perfluoroheptane, see, for example EP 431542 A (Behme et al.) for the description of additional hydrofluorocarbon ethers.

The PFC blowing agents are perfluoroaliphatic or perfluorocycloaliphatic, and have 4 to 12 carbons atoms, preferably 4 to 8 carbon atoms, and may contain heteroatoms, such as divalent oxygen, trivalent nitrogen, or polyvalent sulfur. Specific examples of suitable PFC blowing agents useful in practicing the present invention include, among others, perfluoroalkanes, such as perfluorobutane, perfluoropentane, perfluorohexane, perfluoroheptane, perfluorooctane; perfluorocycloalkanes, such as perfluorocyclobutane, perfluorodimethylcyclobutane, perfluoromethylcyclopentane; perfluoroethers, such as perfluoro-2-butyl-tetrahydrofuran, formals, such as perfluoro-3,5-dioxaheptane; perfluoroamines, such as perfluorotriethylamine, perfluorotripropylamine, perfluorotributylamine, perfluoro-N-methyl pyrrolidine; perfluoroaminoethers, such as perfluoro-N-methyl morpholine; and perfluorinated sulfur compounds.

The mixture can further include other conventional physical blowing agents, such as hydrocarbons, for example, pentane and hexane; or chlorofluorocarbons, for example, fluorotrichloromethane, dichlorodifluoromethane. The additional conventional physical blowing agents when used, may be mixed in an amount in the range of 0.5% to 99.5% by weight of the total amount of the mixture, preferably in the range of 40.0% to 95.0% by weight, and more preferably in the range of 75.0% to 90.0% by weight. Although chlorofluorocarbons may be used in the blowing agent mixture of the present invention, it is preferred that the mixture contains no more than 5% by weight of chlorofluorocarbons. It is also within the scope of the present invention to add chemical compounds to the emulsion that form gaseous blowing agents by means of a reaction or thermal decomposition, such as, isocyanate groups reacted with water to produce $CO_2$. The blowing agents are thermally stable in the gaseous form, that is, under conditions of use, and do not have deleterious effects on the physical or chemical properties of the foamed plastic.

In another aspect of the present invention, a blowing agent emulsion for making polyurethane foam is provided comprising
(a) at least one high molecular weight compound with at least two reactive hydrogen atoms, such as a polyol, typically used in making foamed polyurethane,
(b) a blowing agent mixture wherein the mixture comprises
(1) one or more low boiling HCFC and/or one or more low boiling HFC, and
(2) one or more low boiling, chlorine-free perfluorinated compound, and
(c) a fluorochemical surfactant. Additionally, a silicone surfactant may be added to the blowing agent emulsion. Furthermore, the second component of a polyurethane, that is, an organic and/or modified organic polyisocyanate may be added to the emulsion in the absence of a polymerizing catalyst, which is added just prior to foaming the emulsion. Alternatively, a polymerizing catalyst may be added to the emulsion, and then the emulsion is added to an organic or modified organic polyisocyanate.

The blowing agent emulsion should remain sufficiently stable, that is, not phase-separate, long enough to prepare a foamed plastic. However, it is preferred that the emulsion is stable for at least one day at room temperature, and more preferably for at least one week at room temperature.

In another aspect of the present invention, a foamed plastic, such as foamed polyurethane, is provided prepared from an emulsion comprising
(a) a foamable polymerizable precursor mixture wherein the polymerizable precursor comprises
(1) at least one high molecular weight compound with at least two reactive hydrogen atoms, and
(2) an organic and/or modified organic polyisocyanate,
(b) a blowing agent mixture comprising
(1) one or more low boiling HCFC and/or one or more low boiling HFC, and
(2) one or more chlorine-free perfluorinated compound,
(3) optionally, one or more hydrocarbon compound
(c) a fluorochemical surfactant,
(d) a catalyst,
(e) optionally, a silicone surfactant, and
(f) optionally, one or more other conventional components of foam formulation such as, fillers, flame retardants, or colorants.

A class of fluorochemical surfactants suitable for use in the present invention are fluoroaliphatic oligomers, such as those represented by the following general formulae:

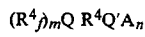   (I)

(II)

wherein $R^4_f$ is a fluoroaliphatic group, $R^4$ is a water solubilizing divalent organic group free of functional groups containing active hydrogen atoms, such as poly(oxyalkylene) or alkylene, Q is a linkage through which $R^4_f$ and $R^4$ radicals are covalently bonded together, A is a monovalent terminal organic group, A' is A or a valence bond, with the proviso that at least one A' is a valence bond connecting a Q-bonded $R^4$ group to another Q, Q' is a linkage through which A, or A', and $R^4$ are covalently bonded together, m is an integer of at least 2, and can be high as 25 or higher, n is an integer of at least 2, and can be as high as 60 or higher, and z is an integer of 2 or higher, and can be as high as 30 or higher. Specific examples of fluorochemical surfactants are described in U.S. Pat. Nos. 3,787,351 and 4,668,406, which descriptions are incorporated herein by reference. Fluoroaliphatic oligomers are commercially available from Minnesota Mining and Manufacturing Company, St. Paul, MN.

A class of silicone surfactants suitable for use in the present invention are those represented by the following formula described in Zäske et al., Journal of Cellular Plastics, Nov–Dec. pg. 38–45 (1981):

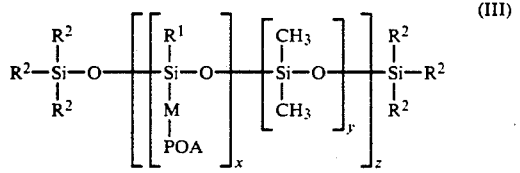
(III)

wherein $R^1$ and $R^2$ are a lower alkyl group, for example, containing 1 to 8 carbon atoms, M is a divalent linking group, such as alkylene $(CH_2)_q$ where q is 0 to 10, POA is $(C_nH_{2n}O)_mR^1$ consisting of polyoxyethylene and polyoxypropylene units, for example, in weight ratio of 50:50 to 80:20, n is an integer 1 to 4, m is an integer such that the molecular weight of the POA is in the range of 1400 to 3000. The average molecular weight of the surfactant is generally from about 2000 to 20,000, and preferably between 5000 and 50,000.

Silicone surfactants suitable for use in the present invention are also described, for example, in U.S. Pat. Nos. 3,404,105, 3,519,579, 3,518,288, and 3,594,334 and U.K. Patent Nos. 1 114 428, 1 130 824, 1 130 824, and 1 151 960. Silicone surfactants are commercially available for example from Dow Corning, and Union Carbide Foamable polymerizable reaction mixtures that can be used in the practice of this invention to produce foamed plastic include polymerizable reaction mixtures of styrene or substituted styrene homopolymers or copolymers with butadiene and acrylonitrile; vinyl chloride homopolymers or co-polymers with other vinyls; ethylene homopolymers and co-polymers with varying percentages of the materials, for example, 2-butene or acrylic acid, propylene, or butadiene; isocyanate-derived polymers, such as, polyurethanes and polyisocyanurates; and phenolic homopolymers (for example, resoles and novolacs). Preferably, the foamed plastics of the present invention are polyurethane foams and polyisocyanurate foams that can be used where conventional polyurethane and polyisocyanurate foams can be used.

The organic polyisocyanate component of the polyurethane precursor reaction mixture that can be cured or polymerized with the perfluorinated blowing agent of the present invention may be any aliphatic, cycloaliphatic, arylaliphatic, aromatic, or heterocyclic polyisocyanate, or any combination of such polyisocyanates.

As examples of polyisocyanates there may be mentioned any of the polyisocyanates proposed in the literature for use in the production of foams. Of particular importance are aromatic diisocyanates, such as tolylene and diphenylmethane diisocyanate in pure, modified or crude forms. Special mention may be made of MDI variants or modified organic polyisocyanate (diphenylmethane diisocyanate modified by the introduction of urethane, allophanate, urea, biuret, carbodiimide, uretonimine, or isocyanurate residues) and the mixture of diphenyl diisocyanate(s) and oligomers thereof known in the art as "crude" or "polymeric" MDI (polymethylene polyphenylene polyisocyanates).

Examples of polyisocyanates that can be used in this invention are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate, and mixtures of these isomers, diisocyanato-3,3,5-trimethyl-5-isocyanatomethyl cyclohexane, 2,4- and 2,6-hexahydrotolylene diisocyanate, and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate, and mixtures of these isomers, diphenylmethane-2,4'- and/or -4,4'-diisocyanate, naphthalene-1,5-diisocyanate, and the reaction products of four equivalents of the aforementioned isocyanate-containing compounds with compounds containing two isocyanate-reactive groups. See U.S. Pat. No. 4,972,002 (Volkert) describing the various polyisocyanates and polyols useful in practicing the present invention, and such description is incorporated herein by reference.

According to the present invention, it is also possible, for example, to use triphenyl methane-4,4',4''-triisocyanate, polyphenyl polymethylene polyisocyanates, m- and p-isocyanatophenyl suphonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, reaction products of the above-mentioned diisocyanates with acetals and polyisocyanates containing polymeric fatty acid esters.

It is within the scope of this invention to use distillation residues having isocyanate groups obtained in the commercial production of isocyanates, optionally in solution in one or more of the above-mentioned polyisocyanates. It is within the scope of this invention to use any mixtures of the above-mentioned polyisocyanates.

Suitable compounds which can be reacted with the polyisocyanates in the practice of this invention are those containing at least 2 isocyanate-reactive hydrogen atoms. Such compounds can be high or low molecular weight compounds, having a weight average molecular weight, generally from about 50 to 50,000. In addition to compounds containing amino groups, thiol groups, or carboxyl groups, are preferably, compounds containing hydroxyl groups, particularly compounds containing from about 2 to 50 hydroxyl groups and above all, compounds having a weight average molecular weight of from about 500 to 25,000, for example, polyesters, polyethers, polythioethers, polyacetals, polycarbonates, polymethacrylates, and polyester amides, containing at least 2, generally from about 2 to 8, but preferably from about 2 to 4 hydroxyl groups, or even hydroxyl-containing prepolymers of these compounds and a less than equivalent quantity of polyisocyanates, of the type known for the production of polyurethanes.

Representatives of the above-mentioned compounds used in accordance with the present invention are described, for example, in Saunders and Frisch, supra, Kuntstoff-Handbunch, supra. It is, of course, possible to use mixtures of the above-mentioned compounds containing at least two isocyanate-reactive hydrogen atoms and having a molecular weight of from about 50 to 50,000 for example, mixtures of polyethers and polyesters.

In some cases, it is particularly advantageous to combine low-melting and high-melting polyhydroxyl containing compounds with one another, as described in German Offenlegungsschrift No. 2,706,297.

Low molecular weight compounds containing at least two isocyanate-reactive hydrogen atoms (molecular weight from about 50 to 400) suitable for use in accordance with the present invention are compounds preferably containing hydroxyl groups and generally containing from about 2 to 8, preferably from about 2 to 4 isocyanate-reactive hydrogen atoms. It is within the scope of this invention to use mixtures of different compounds containing at least two isocyanate-reactive hydrogen atoms and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1-8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxyl diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") that are formed in the autocondensation of formaldehyde hydrate in the present of metal compounds as catalysts and compounds capable of enediol formation as cocatalysts (German Offenlegungsschrift Nos. 2,639,084, 2,714,084, 2,714,104, 2,721,186, 2,738,154, and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (German Offenlegungsschrift No. 2,638,759).

Many other compounds containing isocyanate-reactive hydrogen atoms and polyisocyanates are useful in the present invention, and will be apparent to those skilled in the art of polyurethane science and technology, in light of this specification.

The foams of this invention containing urethane groups or urethane and isocyanurate groups can be produced with or without the use of chain extenders and/or crosslinking agents. To modify the mechanical properties, for example, hardness, however, it is known to be advantageous to add chain extenders, crosslinking agents or a mixture thereof. Suitable chain extenders and/or crosslinking agents include diols, and triols with a molecular weight of less than 400. Examples include aliphatic, cycloaliphatic, arylaliphatic diols with 2 to 14 carbon atoms. Specific examples of diols include but are not limited to ethylene glycol, 1,3-propanediol, 1,10-decandiol, o-, m-, and p-dihydroxycyclohexane, diethylene glycol, dipropylene glycol, 1,4-butanediol, 1,6-hexanediol, and bis(2-hydroxyethyl)hydroquinone. Some examples of triols include but are not limited to 1,2,4- and 1,3,5-trihydroxycyclohexane, glycerol, trimethylolpropane and low molecular weight hydroxyl group containing polyalkylene oxides based on ethylene oxide and 1,2-propylene oxide.

In addition to the aforementioned diols and triols, it is also within the scope of this invention to use secondary aromatic diamines, primary aromatic diamines, 3,3'-di- or 3,3',5,5'-tetraalkyl-substituted diaminodiphenylmethanes.

Examples of secondary aromatic diamines include N,N'-dialkyl-substituted aromatic diamines, which may optionally be substituted on the aromatic ring by alkyl groups, where there are 1 to 20 carbon atoms in the N-alkyl group, such as N,N'-diethyl, N,N'-di-sec-pentyl, N,N'-di-sec-hexyl, N,N'-di-sec-decyl, N,N'-dicyclohexyl-p- and -m-phenylenediamine, N,N'-dimethyl, N,N'-dicyclohexyl-4,4'-diaminodiphenylmethane, and N,N'-di-sec-butylbenzidine.

The chain extenders or crosslinking agents may be used individually or as mixtures of the same of different types of compounds.

If chain extenders, crosslinking agents or mixtures thereof are used, they are generally used in the amounts of 2 to 60 wt %, based on the weight of the components.

The blowing agent mixture used to practice this invention, may be emulsified in either of the polyurethane precursor components or in mixtures of the second component and cross-linking agents to form emulsions.

In a preferred embodiment, the emulsion containing a blowing agent mixture according to this invention comprises:

(1) 0.1 to 150 parts by weight of a blowing agent mixture, wherein the mixture comprises (a) one or more low boiling HCFC and/or one or more low boiling HFC, (b) one or more low boiling chlorine-free perfluorinated compound, and (c) optionally, one or more conventional physical blowing agent such as, for example, hydrocarbons, or chlorofluorocarbons, (2) 80 to 300 parts by weight of at least one higher molecular weight compound with at least two reactive hydrogen atoms, or mixtures thereof, (3) 80 to 300 parts by weight of at least one organic and/or modified organic polyisocyanate, and low molecular chain extenders and/or crosslinking agents, (4) 0.01 to 10.0 parts by weight of at least one fluorochemical surfactant, (5) 0 to 10 parts by weight of at least one silicone surfactant, and (6) 0 to 50 parts by weight of water.

To produce emulsions containing a blowing agent, polyurethane precursor components or the high molecular weight compound with at least two reactive hydrogens or mixtures thereof and low molecular chain extenders and/or crosslinking agents, and blowing agent are mixed thoroughly together in the presence of the fluorinated surfactant or a mixture thereof with a silicone surfactant at temperatures in the range of 0° C. to 70° C., preferably in the range of 20° C. to 50° C. If the perfluorinated blowing agents are gaseous at room temperature, they are liquified before or during preparation of the emulsion by applying a pressure of up to 5 Megapascal (MPa) to the reaction mixture.

The preferred blowing agent mixture to produce a foamed polyisocyanate and foamed polyisocyanurate depends on the density that is desired and the amount of water, optionally to be added to the reaction mixture. In general, amounts of 1 to 50 parts by weight blowing agent mixture, based on 100 parts by weight precursor components or high molecular compound with at least two reactive hydrogens and low molecular chain extenders and/or crosslinking agents yield satisfactory results.

Suitable polymerization catalysts for producing the foamed plastics of this invention include especially compounds that greatly accelerate the reaction of the hydroxyl group-containing compounds and optionally, the chain extenders and/or crosslinking agents with the organic polyisocyanates. Catalysts are present in catalytically effective amounts and suitable catalysts are described in U.S. Pat. No. 4,972,002 and EPO 0 364 074 A1, and such descriptions are incorporated herein by reference.

Optionally, other additives and/or processing aids may be incorporated into the reaction mixture to produce the foamed plastics. Examples include surface active substances, foam stabilizers, cell regulators, fillers, colorants, flame retardants, hydrolysis preventing agents, fungicides, bactericides, and other additives and/or processing aids as known to those skilled in the art can be added to the reaction mixture. These additives and/or processing aids can be added in an amount effective for their intended purpose. Generally, the amount of such additives and/or processing aids is in the range of 0.001 to 99.9 parts by weight, per 100 parts by weight of the reaction mixture.

The soft elastic, semirigid, and rigid foams of this invention can be produced with a density of 0.02 to 0.75 g.cm$^{-3}$. The foams can be used, for example, in the automobile industry, aircraft industry, shipbuilding industry, furniture and athletic equipment industry and upholstery materials, housing parts, ski shoes, and ski cores. They are especially suitable as insulation materials in the construction and refrigeration industry.

For example, flexible polyurethane foam of this invention can be used in transportation, principally for passenger car seating, as underlay for carpeting, laminate textile products, engineering packaging, filters, sponges, scrubbers, fabric softener carriers, squeegees, and paint applicators. Rigid polyurethane can be used for insulation. Foam laminates of rigid polyurethane foam are useful for residential sheathing (with aluminum skins) and roofing board (with roofing-paper skins). Metal doors and appliance insulation can be insulated by a foam-in-place process. For example, in refrigeration, the polyurethane foam of the present invention can replace fiberglass insulation. Rigid polyurethane of this invention also used as insulation for refrigerated truck trailers, bodies, and rail cars. Packaging can also be foamed-in-place to protect equipment such as pumps or motors.

Objects and advantages of this invention are further illustrated by the following examples, but the particular materials and amounts thereof recited in these examples, as well as other conditions and details, should not be construed to unduly limit this invention. All materials are commercially available or known in the literature except where otherwise stated or apparent. The fluorochemical surfactant used in the Examples and Comparative Examples are as described in Example 1 of U.S. Pat. No. 3,787,351 and the fluorochemical surfactant designated with a (*) is as described in Example 2 of U.S. Pat. No. 3,787,351. The lambda values were measured on a Hesto Lambda Control A50-A thermal conductivity analyzer with a reproducibility of ±0.1. The comparative cell sizes described in the examples are as follows:

| | |
|---|---|
| very fine | 50–70 micrometers ($\mu$m) |
| fine | 70–100 $\mu$m |
| medium | 100–150 $\mu$m |
| large | greater than 150 $\mu$m |

EXAMPLES

Example 1

This example illustrates the making of a polyurethane-based foam containing a blowing agent mixture of an HCFC and a chlorine-free perfluorinated compound; and a fluorochemical surfactant.

Component A contained:

187.5 parts by weight of a mixture of polymeric methylene diphenyldiisocyanate, having an isocyanate equivalent of 132 (commercially available from Dow Chemical as PAPI 135).

Component B contained:

(1) 150 parts by weight of a mixture of polymeric polyetherpolyol having an average molecular weight of 630 prepared by the reaction of sorbitol with propylene oxide (commercially available from ICI America);

(2) 3.0 parts by weight of water;

(3) 4.5 parts by weight of an oligomeric fluorochemical surfactant, as described in Example 1 of U.S. Pat. No. 3,787,351;

(4) 3.75 parts by weight of N,N-dimethylcyclohexylamine catalyst (commercially available from Aldrich Chemical);

(5) 20.1 parts by weight of 1,1,1-trifluoro-2,2-dichloroethane (commercially available as HCFC-123); and (6) 9.5 parts by weight of perfluoropentane (commercially available from 3M Co.).

Components A and B were admixed in a container at room temperature and vigorously stirred for 15 seconds at about 2000–3000 rpms with an electric stirrer. The product was a rigid foam having a uniform distribution of fine closed cells. The percentage of closed cells was approximately 90%. The thermal conductivity (lambda factor) was measured in a section of the rigid foam and was 21.7 mW.(m.K)$^{-1}$. The same section of foam was measured a total of four (4) times, the four measurements were 21.7, 21.7, 21.6 and 21.6. Two different sections of the rigid foam were measured for thermal conductivity and the results were 21.7 and 21.6.

EXAMPLES 2-10

In Examples 2-10, a foamed plastic was made according to the procedure of Example 1, using the components and amounts as indicated in Tables 2 and 3. The results are summarized in Table 6.

COMPARATIVE EXAMPLES C1-C9

In Comparative Examples C1-C9, a foamed plastic was made according to the procedure of Example 1, using the components and amounts as indicated in Tables 4 and 5. The results are summarized in Table 6.

EXAMPLES 11-17

In Examples 11-17, a foamed plastic was made according to the procedure of Example 1, using the components and amounts as indicated below:

| Ingredient (Examples 11-17) | Amount Parts by Weight |
|---|---|
| Polyisocyanate: PAPI 27 | 109.6 |
| Polyol: Voranol 360 (Dow Chemical) | 100 |
| Fluorochemical surfactant | 3 |
| Water | 1.6 |
| Perfluorohexane | 7.2 |
| Catalyst: N,N-dimethylcyclohexylamine | 1.5 |

The HFC component of the blowing agent mixture was as follows:

| | | |
|---|---|---|
| Example 11 | 1-methyl-2,2,3,3-tetrafluorocyclobutane | 9.6 |
| Example 12 | 1-trifluoromethyl-1,2,2-trifluoro methylcyclobutane | 14.4 |
| Example 13 | 2-hydro-3-oxa-perfluoroheptane | 21.2 |
| Example 14 | 2-methyl-2-trifluoromethyl perfluoropentane | 22.2 |
| Example 15 | 1-trifluoromethyl-1,2,2-trifluoro-cyclobutane | 25.1 |
| Example 16 | 1,1,1,2,2,3,3-heptafluoroheptane | 13.5 |
| Example 17 | 1-hydropentadecafluoroheptane | 24.1 |

The results are summarized in Table 7.

| Ingredient (Example 18) | Amount Parts by Weight |
|---|---|
| Polyisocyanate: PAPI 135 | 125 |
| Polyol: ICI-C | 100 |
| Fluorochemical surfactant | 3 |
| Water | 2 |
| Perfluorotripropylamine | 11.4 |
| 1-Hydropentadecafluoroheptane | 36.8 |
| Catalyst: N,N-dimethylcyclohexylamine | 2 |

A foamed plastic was prepared according to the procedure of Example 1 using the ingredients as listed in the above table. The resulting rigid, closed-cell foamed plastic had a fine cell size and an initial lambda value of 21.6 mW/mK.

TABLE 2

| Component | Examples (All amounts are parts by weight) | | | | |
|---|---|---|---|---|---|
| | 2 | 3 | 4 | 5 | 6 |
| Polyol: ICI-C | 150 | 150 | 150 | 150 | 150 |
| Polyol: Bayer PU 1732 | — | — | — | — | — |
| Isocyanate: PAPI 135 | 187.5 | 187.5 | 187.5 | 187.5 | 187.5 |
| Fluorochemical surfactant | 2.25 | 9* | 4.5 | 4.5 | 4.5 |
| Silicone surfactant: Dow Corning DC-193 | 2.25 | — | — | — | — |
| Water | 3 | 3 | 3 | 3 | 3 |
| Trifluorodichloroethane: HCFC-123 | 20.1 | 20.1 | 20.1 | 20.1 | 20.1 |
| Cyclopentane | — | — | — | — | — |
| Isopropylchloride | — | — | — | — | — |
| Perfluoro N-methylmorpholine | — | — | — | 9.8 | — |
| Perfluorohexane | — | — | — | — | — |
| Perfluoropentane | 9.5 | 9.5 | — | — | — |
| Perfluorotripropylamine | — | — | 17.1 | — | — |
| Perfluoropolyether: Galden LS-217 | — | — | — | — | 28.1 |
| Catalyst: N,N-Dimethylcyclohexylamine | 3.75 | 3.75 | 3.75 | 3.75 | 3.75 |

TABLE 3

| Component | Examples (All amounts are parts by weight) | | | |
|---|---|---|---|---|
| | 7 | 8 | 9 | 10 |
| Polyol: ICI-C | — | — | — | — |
| Polyol: Bayer PU 1732 | 200 | 200 | 200 | 200 |
| Isocyanate: PAPI 135 | 300 | 300 | 300 | 300 |
| Fluorochemical surfactant | 6 | 3 | 6 | 6 |
| Silicone surfactant: Dow Corning DC-193 | — | 3 | — | — |
| Water | 4 | 4 | 4 | 7.2 |
| Trifluorodichloroethane: HCFC-123 | — | — | — | — |
| Cyclopentane | — | — | 12.6 | — |
| Isopropylchloride | 13.6 | 13.6 | — | — |
| Perfluoro N-methylmorpholine | — | — | — | — |
| Perfluorohexane | 14.8 | 14.8 | 14.8 | 14.8 |
| Perfluoropentane | — | — | — | — |
| Perfluorotripropylamine | — | — | — | — |
| Perfluoropolyether: Galden LS-217 | — | — | — | — |
| Catalyst: N,N-Dimethylcyclohexylamine | 3 | 3 | 3 | 3 |

TABLE 4

| Component | Comparative Examples (All amounts are parts by weight) | | | | |
|---|---|---|---|---|---|
| | C1 | C2 | C3 | C4 | C5 |
| Polyol: ICI-C | 150 | 150 | — | 150 | — |
| Polyol: Bayer PU 1732 | — | — | 200 | — | 200 |
| Isocyanate: PAPI 135 | 187.5 | 187.5 | 300 | 187.5 | 300 |
| Fluorochemical surfactant | — | 9* | 6 | 2.25 | — |
| Silicone surfactant: Dow Corning DC-193 | 4.5 | — | — | 2.25 | 6 |
| Water | 3 | 3 | 4 | 3 | 4 |
| Trifluorodichloroethane: HCFC-123 | 20.1 | — | — | — | — |
| Cyclopentane | — | — | 15.7 | — | 15.7 |
| Isopropylchloride | — | — | — | — | — |
| Perfluoro N-methylmorpholine | — | — | — | — | — |
| Perfluorohexane | — | — | — | 55.3 | — |
| Perfluoropentane | 9.5 | 47.1 | — | — | — |
| Perfluorotripropylamine | — | — | — | — | — |
| Perfluoropolyether: Galden LS-217 | — | — | — | — | — |
| Catalyst: N,N-Dimethylcyclohexylamine | 3.75 | 3.75 | 3 | 3.75 | 3 |

TABLE 5

| Component | Comparative Examples (All amounts are parts by weight) | | | |
|---|---|---|---|---|
| | C6 | C7 | C8 | C9 |
| Polyol: ICI-C | — | 150 | 150 | 150 |
| Polyol: Bayer PU 1732 | 200 | — | — | — |
| Isocyanate: PAPI 135 | 300 | 187.5 | 187.5 | 187.5 |
| Fluorochemical surfactant | — | — | 4.5 | 2.25 |

TABLE 5-continued

| Component | Comparative Examples (All amounts are parts by weight) | | | |
|---|---|---|---|---|
| | C6 | C7 | C8 | C9 |
| Silicone surfactant: Dow Corning DC-193 | 6 | 4.5 | — | 2.25 |
| Water | 4 | 3 | 3 | 3 |
| Trifluorodichloroethane: HCFC-123 | — | 25.1 | 25.1 | 25.1 |
| Cyclopentane | 12.6 | — | — | — |
| Isopropylchloride | — | — | — | — |
| Perfluoro N-methylmorpholine | — | — | — | — |
| Perfluorohexane | 14.8 | — | — | — |
| Perfluoropentane | — | — | — | — |
| Perfluorotripropylamine | — | — | — | — |
| Perfluoropolyether: Galden LS-217 | — | — | — | — |
| Catalyst: N,N-Dimethylcyclohexylamine | 3 | 3.75 | 3.75 | 3.75 |

TABLE 6

| Example | Cell Size | Initial Lambda (mW/mK) | Aged Lambda 3 days @ 70° C. |
|---|---|---|---|
| 1 | fine | 21.7 | 21.9 |
| 2 | medium | 24.1 | 24.6 |
| 3 | fine | 21.0 | 21.3 |
| 4 | fine | 20.4 | 20.5 |
| 5 | fine | 19.2 | 19.5 |
| 6 | medium | 21.4 | 21.6 |
| 7 | fine | 22.0 | 22.5 |
| 8 | medium | 22.8 | — |
| 9 | fine | 21.6 | 23.8 |
| 10 | medium | 23.9 | 25.8 |
| C1 | medium | 24.8 | 25.3 |
| C2 | very fine | 22.4 | 23.4 |
| C3 | medium | 22.4 | — |
| C4 | large | 28.2 | 30.2 |
| C5 | medium | 23.6 | — |
| C6 | fine | 23.6 | — |
| C7 | large | 25.2 | — |
| C8 | medium | 22.3 | — |
| C9 | medium | 24.1 | — |

The data indicates that the insulation properties of the present invention are improved, both as indicated by the initial lambda and by the aged lambda. Silicone surfactant tends to produce foams with larger cells and reduced thermal insulation.

TABLE 7

| Example | Cell Size |
|---|---|
| 11 | very fine |
| 12 | very fine |
| 13 | fine |
| 14 | medium |
| 15 | very fine |
| 16 | medium |
| 17 | medium |

Various modifications and alterations of this invention will become apparent to those skilled in the art without departing from the scope and principles of this invention, and it should be understood that this invention is not to be unduly limited to the illustrative embodiments set forth hereinabove.

We claim:

1. A blowing agent emulsion comprising:
   (a) at least one high molecular weight compound with at least two reactive hydrogen atoms,
   (b) blowing agent mixture, wherein said mixture comprises
      (1) one or more low boiling, hydrochlorofluorocarbon, and/or one or more low boiling, hydrofluorocarbon, and
      (2) one or more low boiling, chlorine-free perfluorinated compound, and
   (c) fluorochemical surfactant.

2. The blowing agent emulsion of claim 1 further comprising a silicone surfactant.

3. The blowing agent emulsion of claim 1 further comprising chain extenders and/or crosslinking agents.

4. The blowing agent emulsion of claim 1 further comprising at least one catalyst.

5. The blowing agent emulsion according to claim 1, wherein said blowing agent mixture comprises 1,1,1-trifluoro-2,2-dichloroethane and perfluorohexane.

6. The blowing agent emulsion according to claim 1, wherein said blowing agent mixture comprises 1,1-dichloro-1-fluoroethane and perfluorohexane.

7. The blowing agent emulsion according to claim 1, wherein said blowing agent mixture comprises chlorodifluoromethane and perfluorohexane.

8. The blowing agent emulsion according to claim 1, wherein said blowing agent mixture comprises 1,1,1,2-tetrafluoroethane and perfluorohexane.

9. The blowing agent emulsion according to claim 1, wherein said blowing agent mixture comprises pentafluoroethane and perfluorohexane.

10. The blowing agent emulsion according to claim 1, wherein said blowing agent mixture comprises 1,1,1,4,4,4-hexafluorobutane and perfluorohexane.

11. The blowing agent emulsion according to claim 1, wherein said blowing agent mixture comprises 1-chloro-1,1-difluoroethane and perfluorohexane.

12. The blowing agent emulsion according to claim 1, wherein said blowing agent mixture comprises 1,1,1-trifluoro-2,2-dichloroethane and perfluoropentane.

13. The blowing agent emulsion according to claim 1, wherein said blowing agent mixture comprises 1,1,1-trifluoro-2,2-dichloroethane and perfluorotripropylamine.

14. The blowing agent emulsion of claim 1, wherein said blowing agent mixture comprises 1-trifluoromethyl-1,2,2-trifluorocyclobutane and perfluorohexane.

15. The blowing agent emulsion of claim 1, wherein said blowing agent mixture comprises 1-hydropentadecafluoroheptane and perfluorohexane.

16. The blowing agent emulsion according to claim 4, comprising
   (a) 80 to 300 parts by weight of a higher molecular weight compound with at least two reactive hydrogen atoms,
   (b) 0.1 to 150 parts by weight of the blowing agent mixture according to claim 1,
   (c) 0.01 to 10 parts by weight of a fluorochemical surfactant,
   (d) 0 to 10 parts by weight of a silicone surfactant,
   (e) 0 to 50 parts by weight of water, and
   (f) a catalytically effective amount of catalyst.

17. A foamed plastic comprising the reaction product of the blowing agent emulsion of claim 4 and an organic and/or modified organic polyisocyanate.

18. A process for preparing a foamed plastic comprising the steps:
   (a) admixing an organic and/or modified organic polyisocyanate and at least one high molecular weight compound with at least two reactive hydrogen atoms, in the presence of
      (1) blowing agent mixture, wherein said mixture comprises
         (i) one or more low boiling, hydrochlorofluorocarbon and/or one or more low boiling, hydroflurocarbon, and (ii) one or more low boiling, chlorine-free perfluorinated compound, (2) a catalyst, and (3) a fluorochemical surfactant.

19. The process according to claim 18, further including the steps of (a) emulsifying at least one of said high molecular weight compound with at least two reactive hydrogen atoms, said blowing agent mixture, said catalyst, and said fluorochemical surfactant, and (b) adding said emulsified mixture to said organic or modified organic polyisocyanate.

20. The process according to claim 18, wherein said blowing agent mixture comprises 1,1,1-trifluoro-2,2-dichloroethane and perfluorohexane.

21. The process according to claim 18, wherein said blowing agent mixture comprises 1,1,1-trifluoro-2,2-dichloroethane and perfluoropentane.

22. The process according to claim 18, wherein said blowing agent mixture comprises 1-trifluoromethyl-1,2,2-trifluorocyclobutane and perfluorohexane.

23. The foamed plastic according to claim 17, wherein said blowing agent mixture comprises 1,1,1-trifluoro-2,2-dichloroethane and perfluorohexane.

24. An article insulated by the foamed plastic of claim 17.

25. A blowing agent emulsion for preparing polyurethane foams comprising:

(a) at least one high molecular weight compound with at least two reactive hydrogen atoms, (b) blowing agent mixture, wherein said mixture comprises (1) one or more lowing boiling, hydrochlorofluorocarbon, and/or one or more low boiling, hydrofluorocarbon, and (2) one or more low boiling, chlorine-free perfluorinated compound, and (c) fluorochemical surfactant.

26. The blowing agent emulsion of claim 25 further comprising a silicone surfactant.

27. The blowing agent emulsion of claim 25 further comprising chain extenders and/or crosslinking agents.

28. The blowing agent emulsion of claim 25 further comprising at least one catalyst.

* * * * *

UNITED STATES PATENT AND TRADEMARK OFFICE
CERTIFICATE OF CORRECTION

PATENT NO. : 5,210,106

DATED : May 11, 1993

INVENTOR(S) : Dams et al.

It is certified that error appears in the above-identified patent and that said Letters Patent is hereby corrected as shown below:

Col. 3, line 14, Insert -- - -- between "fine""celled"

Col. 3, line 41, Replace "carbons" with --carbon--

Col. 4, line 24, Enter a hard return after "surfactant."

Col. 5, line 48, Delete second "1,130,824"

Col. 8, line 42, Insert --one-- after "either"

Col. 11, line 43, Insert --EXAMPLE 18-- above the chart

Col 12, line 65, Enter a tab after the second "-" in Table 5

Col. 16, line 12, Replace "lowing" with --low--

Signed and Sealed this

Fifteenth Day of March, 1994

*Attest:*

BRUCE LEHMAN

*Attesting Officer*     *Commissioner of Patents and Trademarks*